United States Patent [19]

Lings

[11] Patent Number: 4,504,189

[45] Date of Patent: Mar. 12, 1985

[54] STATOR VANE FOR A GAS TURBINE ENGINE

[75] Inventor: Barry W. Lings, Derby, England

[73] Assignee: Rolls-Royce Limited, London, England

[21] Appl. No.: 545,774

[22] Filed: Oct. 26, 1983

[30] Foreign Application Priority Data

Nov. 10, 1982 [GB] United Kingdom ............... 8232089

[51] Int. Cl.³ ............................................. F01D 9/06
[52] U.S. Cl. .................................. 415/115; 415/192; 415/DIG. 1
[58] Field of Search ............... 415/191, 192, 194, 195, 415/DIG. 1, 115; 416/97, 236, 237, 232

[56] References Cited

U.S. PATENT DOCUMENTS

| | | |
|---|---|---|
| 2,746,672 | 5/1956 | Doll, Jr. et al. .................... 415/192 |
| 2,801,790 | 8/1957 | Doll, Jr. ............................. 416/237 UX |
| 3,572,962 | 3/1971 | Embleton ......................... 416/237 UX |
| 3,703,808 | 11/1972 | Stearns ............................. 416/97 UX |
| 3,745,629 | 7/1973 | Pask et al. ........................ 415/195 X |

Primary Examiner—Robert E. Garrett
Assistant Examiner—Joseph M. Pitko
Attorney, Agent, or Firm—Cushman, Darby & Cushman

[57] ABSTRACT

A vane for a gas turbine engine has an aerofoil of unconventional shape. The stacking of sections which defines the aerofoil is arranged to produce an aerofoil whose concave flank is convex in spanwise sections and whose convex flank is concave in spanwise sections. In order to reduce the problems produced by the resulting shape of trailing edge the sections are stacked so that all their trailing edges lie in a plane substantially parallel with the plane of the throat formed between the trailing edge and the next adjacent vane in an array.

3 Claims, 4 Drawing Figures

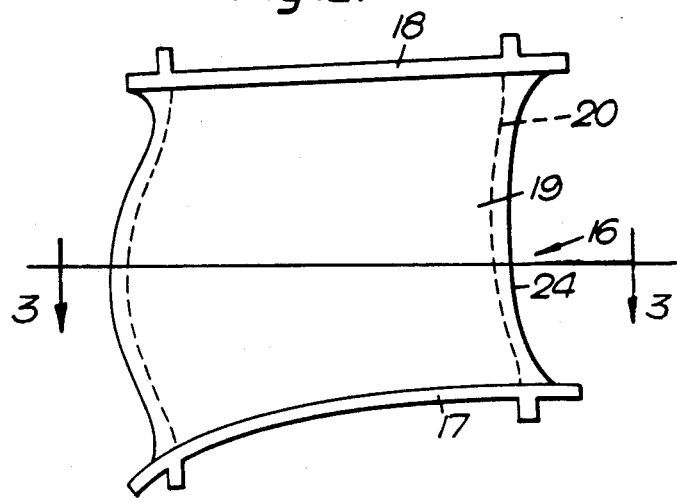
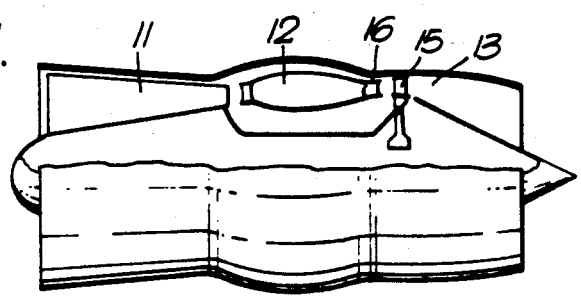
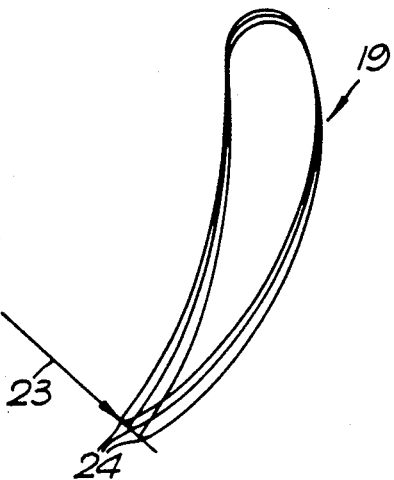
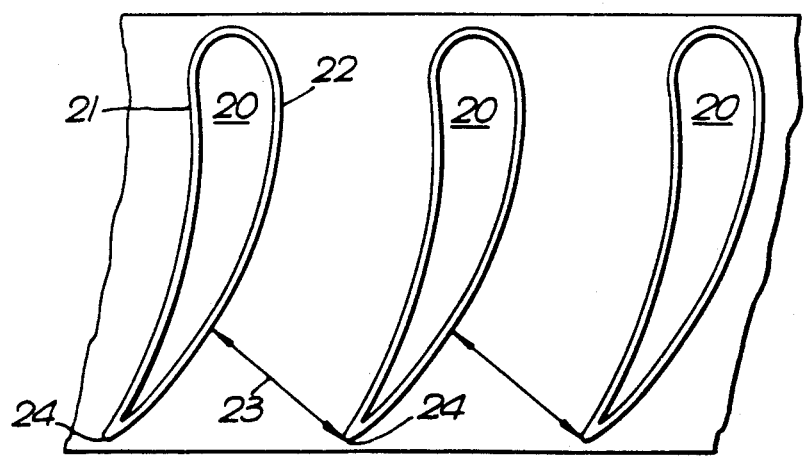

STATOR VANE FOR A GAS TURBINE ENGINE

This invention relates to a stator vane for a gas turbine engine.

The profile of the aerofoil portion of such a vane, as with most of the gas-contacting blades of a gas turbine engine, is normally defined as a series of elemental aerofoil sections which form a stack. By stacking the sections differently it is possible to vary the overall shape of the aerofoil.

Until recently it has been the practice to stack the sections making up a stator vane aerofoil in a very simple way. Thus in one instance the sections are stacked so that the trailing edges of the sections of one aerofoil all lie on a radial line from the axis of the engine. One slight variation from this has been to stack about a straight line in a radial plane but leaning slightly forward to take account of the general direction of airlow through the stator vane.

However, the latest designs of aerofoils require provision to be made for the deterrence of secondary flows spanwise of the aerofoil. One expedient proposed for this purpose has been to curve the aerofoil in the spanwise direction, so that the convex flank of the aerofoil has a concave spanwise profile, while the concave flank has a convex spanwise profile. Such a profile may be achieved quite easily be stacking the sections appropriately, but this can then lead to difficulty in manufacture, to problems with cooling and to an undesirably iregularly shaped throat area between adjacent aerofoils.

The present invention provides a stator vane in which the aerodynamically desirable variation in shape is provided while avoiding these problems.

According to the present invention, a stator vane for a gas turbine engine has an aerofoil the shape of whose aerodynamic profile may be defined by a stack of elemental aerofoil sections, the sections being stacked so that the concave flank of the vane is convex in the spanwise direction and the convex flank is concave in the spanwise direction, the trailing edges of the section being disposed in a single plane substantially parallel with the throat formed between the vane and its next adjacent vane in a vane array.

The elemental aerofoil sections may all be of the same shape.

Commonly the aerofoil will be hollow and various provisions will be made for cooling by the passage of coolline fluid.

The invention will now be particularly described, merely be way of example, with reference to the accompanying drawings in which:

FIG. 1 is a partly broken-away view of a gas turbine engine having vanes in accordance with the invention, FIG. 2 is an enlarged side view of one of the vanes of the engine of FIG. 1 in accordance with the invention, FIG. 3 is a developed central section through those of the vanes of FIG. 2 assembled into a part-annular array, and FIG. 4 illustrates the stacking of aerofoil section elements to make up the aerofoil of a vane in accordance with the invention.

The gas turbine engine illustrated in FIG. 1 is shown for ease of description as a conventional single shaft jet engine. It will be appreciated that this could represent the core of a two-shaft fan engine, or the high pressure spool of a three-shaft fan engine.

The engine 10 comprises a compressor 11, a combustion system 12 and a turbine 13. Operationoverall is conventional, and it will be appreciated that combustion of fuel in the combustion system 12 produces hot gas, which must be directed onto the turbine rotor blades 15 by nozzle guide vanes 16. These vanes embody the present invention.

FIG. 2 shows that each vane 16 is broadly conventional, comprising inner and outer platforms 17 and 18 and an aerofoil 19. The aerofoil 19 will be seen from the FIG. 2 view to be of unconventional shape in that its leading and trailing edges are not formed as straight edges or approximate straight edges but have a pronounced curvature. The reasons behind this will be discussed below. It will also be seen that the interior of the blade is shown in dotted lines at 20 to be hollow, so that cooling air may be fed thereto and produce the desired amount of cooling. This represents a very simple form of cooling, and it would be likely that in practice a much more complex arrangement using inpingement, convective and film cooling would be used.

FIG. 3 is a developed central section through three vanes forming part of an annular array, each vane being sectioned along the line 3—3 in FIG. 2. Here the hollow interiors 20 of the vanes are visible, and it will be seen that each aerofoil has the usual concave and convex flanks 21 and 22 respectively. Also illustrated in FIG. 3 is the 'throat' or smallest area section of the passage formed between the aerofoil 19; as is common practice each throat 23 is formed between the extreme trailing edge 24 of an aerofoil and the convex flank 22 of the next adjacent aerofoil.

As mentioned above, each aerofoil 19 is not a simple prismatic shape but has spanwise curves to form a complex three-dimensional shape, to suppress the spanwise migration of boundary layer forming part of the deleterious 'secondary flows' in a conventional aerofoil. The curvature found to be helpful involves a convex spanwise curve on the concave flank 21 and a concave spanwise curve on the convex flank 22.

It is clearly not possible to produce such a curve while keeping the trailing edge 24 straight, and this can lead to difficulties. Thus if the edge 24 is curved, the throat 23 may comprise an excessively distorted shape which has a bad effect on the aerodynamic efficiency of the aerofoil. Again, it becomes difficult to machine the trailing edge accurately if it forms a three-dimensional curve. The arrangement of the cooling layout may also be difficult since the chordwise distances between the aerofoil trailing edges and the straight line ruled internal features will vary with spanwise position.

In the present invention these difficulties are avoided or reduced in scale by arranging that the stacking of the planar elemental aerofoil sections causes the extreme trailing edges to lie in a plane substantially parallel with the throat 23. FIG. 4 shows how this may be carried out to provide the necessary spanwise curvature and planar distribution of trailing edges. Here the sections are identical and each section is displaced by a small amount with respect to the adjacent sections to provide the necessary curvature. It will be appreciated that various stacking arrangements may be used with identical or differing sectional elements.

The effect of the planar stacking of the trailing edges is threefold. Firstly the throat 23 becomes planar or substantially planar. It may not be precisely planar because the throat angle may vary slightly along the span of the blade due to the shape of the convex flank 22.

However the throat will certainly be relatively close to being planar, and will be efficient aerodynamically. Secondly the machining of the trailing edge becomes very easy; as long as the cutter approaches the aerofoil at the angle of the plane containing the trailing edge a straight milling cutter may be used to trim the edge which may then be blended in the normal way. Thirdly the use of this trailing edge form means that when viewed along the plane of the throat which is also selected ideally as the angle of the centre lines of the internal cooling features, the chordwise distances between trailing edges and internal straight line features in the aerofoil become constant throughout the span, and the flow distances and lengths of ribs and other features also become substantially constant over the span of the aerofoil.

It will be understood that there are various modifications which could be made to the embodiment described above. Thus for instance the cooling system used in the vane would be likely to be more complex than that described, and the aerofoil could well be made as a separate part from the platforms. Again, various different stacking techniques could be used to define the aerofoil shape as long as they retain the trailing edge positioning in accordance with the invention.

I claim:

1. A stator vane assembly for a gas turbine engine comprising:
   a plurality of vanes arranged in an annular array, each of said vanes including an aerofoil having a convex flank, a concave flank and a continuous spanwise extending trailing edge, a throat between each of adjacent vanes, each said throat being defined by said continuous spanwise extending trailing edge of a particular one of said vanes and said convex flank of the adjacent vane in said annular array, said aerofoil of each of said vanes having an aerodynamic profile defined by a stack of planar elemental aerofoil sections, each of said planar elemental aerofoil sections of each one of said vanes having a trailing edge forming part of said spanwise trailing edge of said aerofoil of the particular one of each one of said vanes, said planar elemental aerofoil sections for each of said vanes being stacked to provide said concave flank of said aerofoil of each of said vanes with a concave shape in the spanwise direction and to provide said convex flank of said aerofoil of each of said vanes with a concave shape in the spanwise direction, said trailing edges of the stack of said planar elemental aerofoil sections of each of said vanes being disposed in a single plane extending substantially parallel with said throat between adjacent vanes.

2. A stator vane assembly as claimed in claim 1 and in which said stack of said aerofoil of each of said vanes is hollow and provided with means for cooling it by the passage of cooling fluid.

3. A stator vane assembly as claimed in claim 1 and in which said planar elemental sections of each of said vanes are all of the same shape.

* * * * *